US012679194B2

(12) United States Patent
Muhr et al.

(10) Patent No.: US 12,679,194 B2
(45) Date of Patent: Jul. 14, 2026

(54) HOUSING ASSEMBLY

(71) Applicant: Muhr und Bender KG, Attendorn (DE)

(72) Inventors: Thomas Muhr, Attendorn (DE);
Lutz-Eike Elend, Friedland (DE);
Björn Scholemann, Drolshagen (DE);
Kevin Koch, Attendorn (DE);
Christian Begemann, Attendorn (DE);
Fabian De Luca, Lüdenscheid (DE);
Elisabeth Danger, Paderborn (DE)

(73) Assignee: Muhr und Bender KG, Attendorn (DE)

( * ) Notice: Subject to any disclaimer, the term of this patent is extended or adjusted under 35 U.S.C. 154(b) by 345 days.

(21) Appl. No.: 18/686,006

(22) PCT Filed: Sep. 2, 2022

(86) PCT No.: PCT/EP2022/074447
§ 371 (c)(1),
(2) Date: Feb. 23, 2024

(87) PCT Pub. No.: WO2023/031396
PCT Pub. Date: Mar. 9, 2023

(65) Prior Publication Data
US 2024/0239175 A1     Jul. 18, 2024

(30) Foreign Application Priority Data

Sep. 3, 2021    (DE) ..................... 10 2021 122 902.2

(51) Int. Cl.
*H01M 50/224*     (2021.01)
*B60K 1/04*     (2019.01)
*H01M 50/24*     (2021.01)

(52) U.S. Cl.
CPC ............. *B60K 1/04* (2013.01); *H01M 50/224* (2021.01); *H01M 50/24* (2021.01); *H01M 2220/20* (2013.01)

(58) Field of Classification Search
CPC ............. H01M 10/613; H01M 10/625; H01M 10/6556; H01M 2220/20; H01M 50/249;
(Continued)

(56) References Cited

U.S. PATENT DOCUMENTS 11,996,572 B2 *   5/2024   Lee ..................... H01M 10/613
12,021,210 B2 *   6/2024   Goerdeler ......... H01M 10/6556
(Continued)

FOREIGN PATENT DOCUMENTS

DE      102016120826 A1      5/2018
DE      102016121247 A1      5/2018
(Continued)

OTHER PUBLICATIONS

International Search Report and Written Opinion for PCT/EP2022/074447 mailed Dec. 23, 2022 (9 pages; with English translation).

*Primary Examiner* — James A Shriver, II
*Assistant Examiner* — Hilary L Johns
(74) *Attorney, Agent, or Firm* — Brooks Kushman P.C.

(57) ABSTRACT

A housing assembly for electrical storage comprises a base tray with a base and a circumferentially closed tray frame, that is formed in one piece from a metallic material; a structural frame with a plurality of frame elements and reinforcing elements that are each produced from steel material and are connected to one another to form the structural frame, the structural frame being inserted into the base tray and connected thereto; wherein the yield strength of the steel material of the structural frame is at least 10% greater than the yield strength of the metallic material of the tray frame; and a cover which is releasably connectable to (Continued)

the tray frame, wherein the tray frame and the cover enclose a receiving space for electrical storage.

16 Claims, 5 Drawing Sheets

(58) Field of Classification Search
CPC ........... H01M 10/6554; H01M 50/204; H01M 50/24; H01M 50/289; H01M 10/617; H01M 10/653; H01M 10/655; H01M 10/6557; H01M 10/6568; H01M 50/184; H01M 50/186; H01M 50/20; H01M 50/209; H01M 50/211; H01M 50/231; H01M 50/244; H01M 50/258; H01M 50/262; H01M 50/267; H01M 50/224
USPC ........................................................ 180/68.5
See application file for complete search history.

(56) References Cited

U.S. PATENT DOCUMENTS

| | | | |
|---|---|---|---|
| 2021/0351455 A1* | 11/2021 | Kim | B60L 50/66 |
| 2022/0344739 A1* | 10/2022 | Ishitobi | H01M 10/655 |

FOREIGN PATENT DOCUMENTS

| | | |
|---|---|---|
| DE | 102018105526 A1 | 9/2019 |
| DE | 102018106399 A1 | 9/2019 |
| DE | 102019203400 A1 | 9/2020 |
| DE | 102019212590 A1 | 2/2021 |
| EP | 3855525 A1 | 7/2021 |
| JP | 2021064448 A | 4/2021 |
| KR | 20150081514 A | 7/2015 |
| KR | 20190093133 A | 8/2019 |
| KR | 20200033779 A | 3/2020 |
| KR | 20200140337 A | 12/2020 |
| WO | 2021009256 A1 | 1/2021 |

* cited by examiner

HOUSING ASSEMBLY

CROSS-REFERENCE TO RELATED APPLICATIONS

This application is a national stage of, and as such claims priority to, Patent Cooperation Treaty Application No. PCT/EP2022/074447, filed on Sep. 2, 2022, which application claims priority to German Application No. DE 10 2021 122902.2, filed on Sep. 3, 2021, which applications are hereby incorporated herein by reference in their entireties.

BACKGROUND

An electric vehicle comprises, among other things, an electric machine as a drive source, which is electrically connected to electrical storage means. In drive mode, the electric machine converts electrical energy into mechanical energy to drive the vehicle. The electrical storage means, also known as battery or accumulator, are usually housed in a battery case that is attached to the underside of the vehicle body.

From JP 2021-64448 A, a battery housing is known which has a frame with an opening and a tray which is inserted into the frame. The frame is closed from above by an upper cover and from below by a lower cover. The frame is composed as a framework of several extruded profiles made of an aluminium or magnesium alloy. Alternatively, the frame can also be made of high-strength steel. The tray is made of an aluminium or magnesium alloy.

From DE 10 2016 121 247 A1, a battery tray is known with a tray for receiving batteries and a cover that closes the tray. The tray is a thin-walled sheet metal component produced in one piece by forming, which is made of an aluminium alloy with a yield strength Rp0.2 greater than 250 MPa. Reinforcing struts and a circumferential frame made of profiles are arranged on an outside of the tray.

A battery housing with a tray is known from DE 10 2019 203 400 A1. Reinforcements in the form of profiles made of hardened steel material are arranged along the circumferential tray wall.

From WO 2021/009256 A1, a housing assembly is known with a frame, a base and a cover, which form a housing for electrical storage means. The frame comprises several frame elements made of a metallic material with a variable sheet thickness over the length. The base is connected to the frame in such a way that a sealed tray is formed. The base can have an integrated cooling structure through which a coolant can flow.

From DE 10 2018 106 399 A1, a housing assembly with a tray assembly and a cover assembly is known. The tray assembly has a first formed part and a second formed part, which are produced from flexibly rolled metallic material and joined together so that they have a variable sheet thickness in the longitudinal direction of the respective formed part.

From DE 10 2016 120 826 A1, a battery housing for a vehicle driven by an electric motor is known. The battery housing comprises a tray part with a base and side walls formed thereto and a frame structure surrounding the tray part on the outside, which forms a hollow chamber.

SUMMARY

The present disclosure includes a housing assembly for accommodating electrical storage means including for a motor vehicle driven by an electric motor. The disclosure a housing assembly for accommodating the electrical storage means has good sealing properties, a high resistance to corrosion, and a low weight.

A housing assembly for accommodating electrical storage means for an electric drive of an electrically drivable motor vehicle is described, comprising: a base tray with a base and a circumferentially closed tray frame which is produced from a metallic material by forming; a structural frame which comprises a plurality of frame elements connected to each other to form a circumferential frame and a plurality of reinforcing elements extending between two opposing frame elements, wherein the frame elements and the reinforcing elements are each produced from a steel material and are connected to each other to form the structural frame, and wherein the structural frame is inserted into the base tray and connected thereto; wherein the yield strength of a steel material of the structural frame is at least 10% greater than the yield strength of the metallic material of the tray frame; and a cover which is releasably connectable to the tray frame, wherein the tray frame and the cover enclose a receiving space for electrical storage means.

An advantage is that the design of the individual components of the housing assembly can be easily adapted to the different technical requirements. The tray frame, for example, has particularly good sealing and corrosion protection functions due to forming production from a formable material. This is because the tray frame forms the outer region of the housing assembly, so that no further weld seams are required here to attach other components. All other components inside the tray frame, in particular the structural frame, are therefore optimally protected against corrosion. The average sheet thickness of the tray frame can be reduced to a minimum required for these technical requirements. In general, average sheet thicknesses of the tray frame between 1.0 mm and 3.0 mm are possible, wherein a reduced sheet thickness can be less than 1.4 mm or even less than 1.2 mm, for example. The tray frame is functionally decoupled from the structural frame and therefore does not have to take on any structural-mechanical tasks. Thus, material quality, sheet thickness and, as applicable, coating of the base tray can be optimised for the sealing and corrosion protection functions. In this way, good functional fulfilment and a low weight can be achieved for this large and therefore particularly weight-relevant component.

Accordingly, the structural frame, and/or at least individual elements thereof, can be optimised with regard to the structural-mechanical tasks, respectively strength and/or rigidity without having to compromise on corrosion protection. The dimensions of the individual frame elements and/or reinforcing elements can be customised depending on the expected loads. By specifically reducing the thickness of the frame parts and/or reinforcing elements in regions subject to lower loads, material can be saved so that the housing assembly ultimately has a low weight without compromising on the mechanical properties and can therefore be manufactured cost-effectively. By specifically increasing the thickness of the frame parts and/or reinforcing elements in regions subject to higher loads, particularly in crash-relevant regions, greater strength can be achieved so that the housing assembly can absorb a high load without being destroyed.

In the context of the present disclosure, the "average thickness" of a component with variable thickness may be, for example, the average thickness cumulated over the length of the respective component, or the average thickness between a maximum and a minimum absolute thickness of the component. For components with a constant thickness over the length, the mean thickness is equal to the nominal thickness.

The sheet material of the tray frame can have an elongation at break of possibly at least 15%. This value can refer to the starting material, i.e. before the sheet material is formed to a tray frame, or also to the formed tray frame as a finished product. In the context of the present disclosure, the elongation at break A describes the permanent change in length (Lu–L0) related to the initial gauge length L0 after the sample has broken, i.e. A=(Lu–L0)/L0*100%. The elongation at break A of the material of the tray frame is possibly greater than that of a material of the structural frame. Options for determining the elongation at break and performing the test are described, for example, in DIN EN ISO 6892-1 or ASTM E8/E8M. In particular, a tensile specimen with a rectangular cross-section or for flat products can be used. The initial gauge length L0 of the specimen can be 50 mm, for example, for which the specified elongation at break A of greater than or equal to 15% applies as a minimum, although other specimen lengths in accordance with DIN EN ISO 6892-1 or ASTM E8/E8M are also possible.

The tray frame can, for example, be made from a readily formable steel material or light metal, such as aluminium or an aluminium alloy, as a one-piece formed part. In particular, the material used has a tensile strength and/or yield strength (Rp0.2) of less than 450 MPa. The tray frame is possibly produced from a one-piece sheet metal blank, which is processed into the tray frame by forming operations, in particular by deep drawing, and possibly cutting operations. In the case of particularly large tray frames, several individual sheet metal elements can first be produced separately and joined together in a material bonding manner, for example by welding, before this composite sheet blank is then formed into the tray frame as one part. During the forming process, the tray frame is produced with bevelled wall areas that form a pull-out slope.

According to a first embodiment, the tray frame can be produced in one piece with an integrated base. In this case, the tray frame and base form a one-piece base tray that is accordingly gas- and liquid-tight. The base tray can optionally have a cooling structure. A base tray with an integral cooling structure can be produced, for example, by roll-bonding two aluminium strips, then separating them to form laminated blanks, forming them into a tray shape, in particular by deep drawing, and inflating the cavities. In this design, the tray frame and the base form a one-piece base tray made of the same material.

According to a modified embodiment, the tray frame and the base can also be manufactured separately and then connected to each other in a sealing manner. The base has an integrated cooling structure through which a coolant can flow. The tray frame and cooling base can be connected to each other in a liquid and gas-tight manner, for example, using a hybrid joining technique consisting of gluing together with friction welding or riveting. In this embodiment, the tray frame and cooling base can be made from different materials, for example the tray frame from a cold-formable steel and the cooling base from aluminium or an aluminium alloy.

The cooling base and/or cooling structure can be made from several aluminium strips joined together by roll bonding. By heating and rolling, the aluminium strips are connected to each other in bonding areas, and cut to length to form individual blanks. Hollow areas are then produced by pressurising the un-bonded areas so that these are formed as cavities. The hollow areas of the cooling base are possibly only formed in one of the two aluminium sheets lying on each other, i.e. one sheet element is flat while the other sheet element is deformed. The flat sheet metal element and the formed sheet metal element connected thereto can have the same or different sheet thicknesses, which can be between 0.8 mm and 2.0 mm, for example. The cooling base can be made from an integral roll-bonding element or several interconnected roll-bonding elements.

Viewed in cross-section, the tray frame can have a Z-shaped profile with a lower flange region that merges into the base or is connected thereto, the circumferential wall region that widens away from the base, and an adjoining upper flange region that is used to attach the cover. The widening of the wall region in the direction towards the upper flange region serves as a pull-out slope for the forming tool.

The upper flange region forms, in particular, a flat sealing surface for sealing connection to a counter face of the cover, which is in particular releasably connectable to the tray frame. In the one-piece design, the lower flange region merges integrally into the base or, in the two-piece design, forms a flat sealing surface for sealing connection to a counter face of the cooling base.

The structural frame comprises several frame elements, which are assembled to form a circumferential frame, and several reinforcing elements, which extend between two lateral frame elements and/or support them against each other. The frame elements and/or reinforcing elements can be adapted to the respective technical requirements in terms of their strength and rigidity. For example, at least some of the frame elements and/or at least some of the reinforcing elements can have a variable sheet thickness over the length of the respective element.

Depending on the specific technical requirements, the frame elements can be designed in the form of a two-part hollow profile consisting of a C-shaped outer profile and a C-shaped inner profile connected thereto, or in the form of a one-part profile. By using a two-part or hollow profile, particularly high bending moments of resistance can be achieved, which, depending on the material and sheet thickness, can be over 6500 mm$^3$, for example.

The frame elements and the reinforcing elements can be made from the same or different steel materials. For example, at least some or all of the frame elements of the structural frame can be made of a martensitically hardenable steel, in particular of a manganese-boron-alloyed heat-treatable steel, such as 17MnB3, 22MnB5, 26MnB5 or 34MnB5, although other steel grades are also possible. At least some, possibly all, frame elements of the structural frame can be provided with an anti-corrosion coating, in particular made of an aluminium alloy. This provides good protection against corrosion. The final shape of a component made of martensitically hardenable steel material is possibly produced by hot forming, which can also be referred to as press hardening. For this purpose, the pre-coated starting part, which can have a tensile strength of at least 500 MPa, is first heated to austenitising temperature, then placed in the hot forming tool in a hot state, formed therein and cooled quickly so that a martensitic structure is formed. The finished, i.e. formed and hardened, component can have a final tensile strength of at least 900 MPa, possibly at least 1300 MPa.

The reinforcing elements can be made in particular from a cold-rolled steel, for example a micro-alloyed steel such as HC 420, a dual-phase steel such as DP800 or DP1000, or a complex-phase steel. These steels are cold-formed from a blank into the finished component. Cold-forming steels can be easily formed so that more complex geometries of the reinforcing elements can also be produced. The reinforcing elements can also be provided with an anti-corrosion coating, in particular made of a zinc alloy. However, it is also possible to use a hot-formed steel, as described in connection with the frame elements. In this case, an aluminium alloy is possibly used as the corrosion protection layer.

The reinforcing elements can comprise transverse and/or longitudinal beams that are arranged between the frame elements and firmly connected thereto, for example by welding. The frame elements are supported against each other by means of the reinforcing elements to which they are connected. Overall, this forms a robust structural frame that can be inserted into and connected to the base tray as a prefabricated unit.

According to a possible embodiment, at least some of the reinforcing elements can have incorporated threads which can be produced in particular by perforating, deep-drawing, embossing and/or cutting processes. The threads can be used to attach a cover part and/or battery modules that can be inserted between the reinforcing elements and/or can be designed for this purpose.

In order to attach the housing assembly to a vehicle body, several through-bolt assemblies can be provided, each of which can have a sealed support sleeve that penetrates a reinforcing element. The number of through-bolts in the housing assembly can be 2 to 5 per reinforcing element, for example.

Depending on the technical requirements, at least some reinforcing elements can have a variable sheet thickness over a longest length, wherein the sheet thickness can be increased in particular in the area of the formed-in threads and/or in the area of the through-bolts and/or in the area of the end-side connecting portions that are connected to the frame.

The cover can be designed in one or more parts, optionally with variable or uniform material thickness.

When the cover is connected to the tray frame/bottom unit, a closed housing assembly is formed which is sealed in itself. Leakage of battery fluid from the housing assembly or ingress of dirt is effectively prevented.

BRIEF SUMMARY OF THE DRAWINGS

Example embodiments are explained below with reference to the drawing figures. Herein.

DESCRIPTION

Figures 1A, 1B:
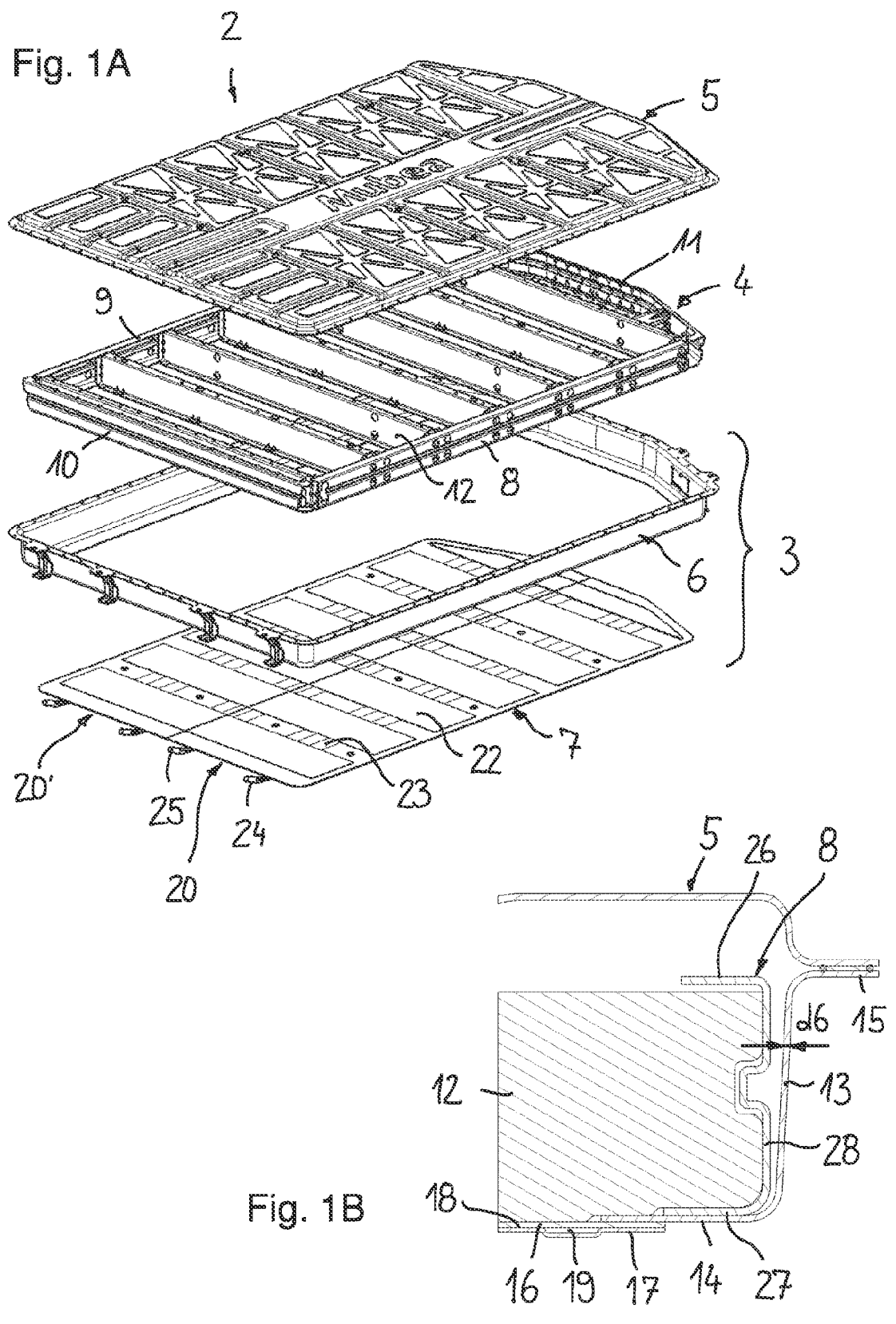
FIG. 1A shows an exploded perspective view of a housing assembly for accommodating electrical storage means in a first embodiment.
FIG. 1B shows a detail of the housing assembly from FIG. 1A in cross-section.

FIGS. 1A and 1B, together also referred to as FIG. 1, show a housing assembly 2, in which electrical storage means (not shown) can be accommodated, in a first embodiment. Such a housing assembly 2 can be connected to the body of a motor vehicle. The electrical storage means serve to store electrical energy, with which an electric motor of the electrically drivable motor vehicle can be supplied with electricity; they can also be referred to as battery modules.

The housing assembly 2 has a base tray 3, a structural frame 4 and a cover 5. In the present embodiment, the base tray 3 is assembled in two parts and comprises a formed, one-piece tray frame 6 and a base 7 sealingly connected thereto. The connection can be made, for example, by welding and/or gluing. In the joined state, the base 7 and the tray frame 6 together form the base tray 3 for receiving the structural frame 4 and the storage means. The structural frame 4 comprises several frame elements 8, 9, 10, 11 joined together to form a circumferential frame and several reinforcing elements 12 extending between two opposing frame elements 8, 9. The frame elements 8, 9, 10, 11 and the reinforcing elements 12 are made of a steel material and are connected to form the structural frame 4. The connection can be made using welding and/or screws, for example. The structural frame 4 is inserted into the base tray 3 and connected thereto. The cover 5 is releasably connectable to the tray frame 6, for example by screw connections (not shown). Overall, a housing with an internal structural frame 4 is achieved, which is protected from environmental influences by the external base tray 3 and/or the cover 5.

Further details of the base tray 3, structural frame 4, and cover 5 are provided below.

The tray frame 6 is produced in one piece by forming, for example by deep drawing of a sheet metal blank and subsequent trimming. The wall regions 13 of the tray frame 6 are produced in particular with pull-out slopes for the forming tool. The tray frame can, for example, be made from a steel material that is easy to form or from a light metal such as aluminium or an aluminium alloy, wherein the metallic material used should have an elongation at break (A50) of at least 15%. The tensile strength and/or yield strength (Rp0.2) is possibly less than 450 MPa. The average sheet thickness d6 of the tray frame 6 is possibly less than 1.4 mm, in particular less than 1.2 mm. The average thickness can, for example, refer to the average thickness accumulated over the entire length of the tray frame, or the average thickness between a maximum and a minimum absolute thickness of the tray part.

As can be seen in particular in FIG. 1B, the tray frame 6 has a Z- or S-shaped profile when viewed in cross-section, in which a lower flange region 14 and an upper flange region 15 are bent in opposite directions from the wall region 13. The lower flange region 14 is bent inwards and has a particularly flat sealing face for sealing connection to the base 7. The upper flange region 15 is bent outwards and has a particularly flat sealing face for sealing connection to a counter face of the cover 5, which is releasably connectable to the tray frame 6 via a plurality of screw connections distributed around the circumference.

The base 7 has an integrated cooling structure and can therefore also be referred to as a cooling base. In the joined state, the base 7 and the tray frame 6 together form a liquid- and gas-tight base tray 3. The cooling base is made of several sheet metal elements 16, 17, in particular of aluminium or an aluminium alloy, joined together by roll bonding. In roll bonding, two metal strips lying on each other, one of which provided with a release agent, are heated and rolled and thereby connected to each other in bonding regions 18. The release agent, which can be applied by screen printing, describes the geometry of the subsequent cavities. In the areas not provided with release agent, the two sheet layers are bonded to each other in a material-locking manner. The un-bonded areas are pressurised so that they deform and form the hollow regions 19. In the present case, the hollow regions 19 are only formed in the lower of the sheet metal elements lying on one another. The upper sheet metal element 16 remains flat, so that a flat contact surface is formed for the battery modules. The sheet thickness of the sheet metal elements 16, 17 can be between 0.8 and 2.0 mm, for example. For a high cooling capacity, the sheet metal elements 16, 17 can have a high thermal conductivity, in particular greater than 100 W/mK.

As can be seen in particular from FIG. 1A, the base 7 has several cooling areas 22, which in the assembled state are spatially separated from one another by the reinforcing elements 12. The number of cooling areas 22 can be adapted to the number of storage elements. The reinforcing elements 12 are each connected to the base 7 in connection areas 23 between two neighbouring cooling areas 22. Furthermore, ports 24, 25 for circulating coolant through the hollow regions 19 are also recognisable. In the present embodiment, the base 7 is composed of two interconnected, roll-bonded base elements 20, 20' and accordingly comprises two cooling structures. However, a design comprising a single roll-bonded base element with a cooling structure is also possible.

The reinforcing elements 12 form connecting webs between the two opposing frame elements 8, 9, which together with the transverse end frame elements 10, 11 form a closed frame. The number of reinforcing elements 12 can be adapted to the number of storage elements. The reinforcing elements 12 extend transversely to the longest length of the housing and can therefore also be referred to as cross beams or cross struts. Designs with longitudinal beams are also possible.

As can be seen in particular in FIG. 1B, the frame elements 8, 9, 10, 11 or at least a partial number thereof have a C-shaped profile in cross-section in the present embodiment. An upper and a lower flange portion 26, 27 are both bent inwards in the same direction from the wall portion 28. The reinforcing elements 12 can have a U-shaped profile in cross-section with flanges on the base side for attachment to the base tray 3 and flanges on the end side for connection to the lateral frame elements 8, 9. The ends of the reinforcing elements 12 engage in the inwardly open cavity of the frame elements 8, 9 formed by the C-profile and are attached thereto, for example by welding.

The frame elements 8, 9, 10, 11, or at least a partial number thereof, are possibly produced from a hot-formable steel, in particular a martensitically hardenable heat-treatable steel, such as 17MnB3, 22MnB5, 26MnB5 or 34MnB5. In this case, by means of hot-forming, the blanks are formed into the finished component and hardened, which results in a particularly high strength of the elements.

The reinforcing elements 12, or at least a partial number thereof, are possibly made from a cold-formable steel, in particular a cold-rolled micro-alloyed steel, such as HC 420, a dual-phase steel, such as DP800 or DP1000, or a complex-phase steel. These steels are cold-formed from a blank into the finished component. Alternatively, the reinforcing elements 12 can also be produced from a hot-formable steel, as described above.

For particularly good corrosion resistance, the frame elements 8, 9, 10, 11 and/or reinforcing elements 12 of the structural frame 4 can have an anti-corrosion coating, in particular made of a zinc-based alloy for cold-forming steels or an aluminium-based alloy for hot-forming steels. The corrosion protection layer is possibly applied to the steel strip before the forming process.

The frame elements 8, 9, 10, 11 and the reinforcing elements 12 can be produced separately and then joined together, for example by welding. Together they form the structural frame 4, which in the present case has a ladder-shaped structure without being limited thereto. Depending on the technical requirements, at least some of the reinforcing elements 12 and/or at least some of the frame elements 8, 9, 10, 11 can have different sheet thicknesses over the respective length. In particular, the structural frame 4 can be inserted into the base tray 3 as a prefabricated and/or self-supporting unit and connected thereto, for example by welds or screw connections.

Figures 2A, 2B, 3A, 3B, 3C:
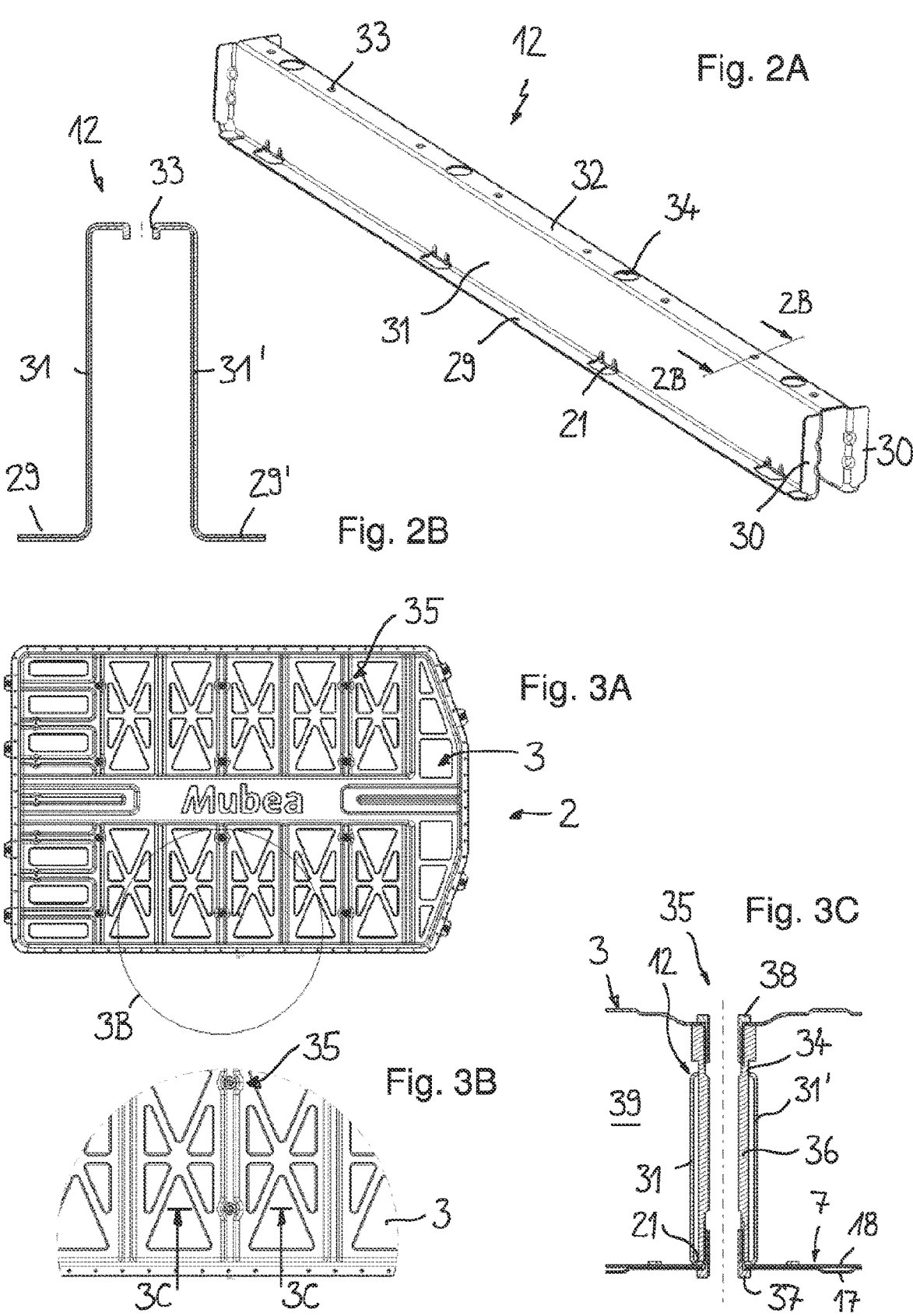
FIG. 2A shows a perspective view of a reinforcing element for a housing assembly.
FIG. 2B shows cross-section of the reinforcing element shown in FIG. 2A.
FIG. 3A shows a top view of the housing assembly shown in FIG. 1A.
FIG. 3b shows a detail of the housing assembly from FIG. 3A in enlarged view.
FIG. 3C shows the housing assembly according to section line 3C-3C from FIG. 3B

FIGS. 2A and 2B show a possible embodiment of a reinforcing element 12. As can be seen in particular in FIG. 2B, the reinforcing element 12 has a U-shaped profile with two laterally projecting flange portions 29, 29' for attachment to the base tray 3. At the opposite ends, the reinforcing elements have laterally bent end flanges 30, 30' for attachment to the longitudinally extending frame elements 8, 9. Optionally, the reinforcing elements 12 can have a plurality of threads 33 incorporated in the base portion 32, wherein the threads can be produced by punching, deep-drawing, embossing and/or cutting processes. The threads 33 are used to attach the cover 5 and/or battery modules. The sheet thickness of the cross members is possibly increased, particularly in the areas of the incorporated threads and/or the end flanges 30, 30'. Furthermore, the reinforcing elements 12 can optionally have a plurality of through-openings 34 in the base portion 32, through which through-bolting from the cover to the base is made possible, which is explained in more detail below with reference to FIG. 3.

FIGS. 3A, 3B and 3C, together also referred to as FIG. 3, show a possible embodiment for connecting the housing assembly 2 to a vehicle body, without being limited thereto. Accordingly, several through-bolt assemblies 35 can be provided, through each of which a screw can be passed from the base to the cover through the housing assembly 2 to attach it to the vehicle body.

The through-bolt assemblies 35 each have an inner sleeve 36, which is inserted into through-openings 34 of the reinforcing elements 12 and arranged between the two side pieces 31, 31'. The inner sleeves 36 are supported downwards against the base 7 and are attached thereto via a lower fixing sleeve 37. The reinforcing elements 12 can have openings with inwardly drawn support flanges 21 in the area of the fixing sleeve 37. At the upper end, the inner sleeves 36 are screwed to the cover 5 via respective fixing sleeves 38. The connections between the inner sleeve 36 and the base 7 on the one hand and the cover 5 on the other are sealed so that no moisture or dirt can penetrate into the housing interior 39. The number of through-bolt assemblies 35 per cross member is a maximum of 5, for example.

Figures 4A, 4B:
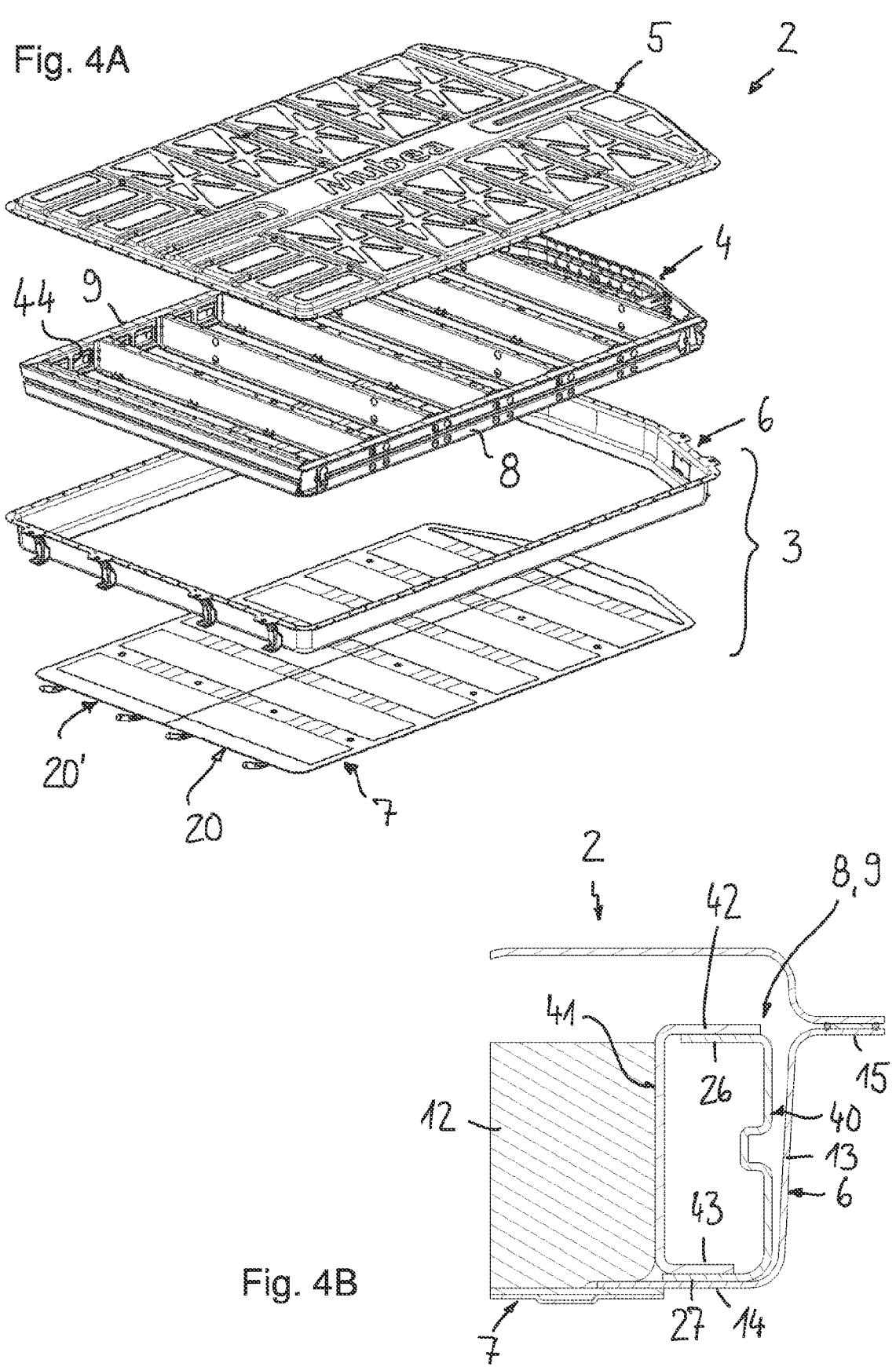
FIG. 4A shows an exploded perspective view of a housing assembly in a further embodiment.
FIG. 4B shows a detail of the housing assembly from FIG. 4A in cross-section.

FIGS. 4A and 4B, together also referred to as FIG. 4, show a housing assembly 2 in a modified embodiment. This largely corresponds to the embodiment shown in FIGS. 1 to 3, so that reference is made to the above description with regard to the similarities. Identical and/or corresponding components are labelled with the same reference signs as in FIGS. 1 to 3 above.

The only difference in the present embodiment according to FIG. 4 lies in the design of the frame elements 8, 9, which are designed in the form of a two-part hollow profile comprising a C-shaped outer profile 40 and a C-shaped inner profile 41 connected thereto. The upper flange sections 26, 42 and the lower flange sections 27, 43 of the outer profile 40 and the inner profile 41 are directed towards each other, so that a hollow space is formed when viewed in cross-section. The inner profiles 41 can have several weight-reducing openings 44 along their length. Overall, the frame elements 8, 9 made of two profiles have greater strength, rigidity and/or a particularly high bending moment of resistance.

Figures 5, 6:
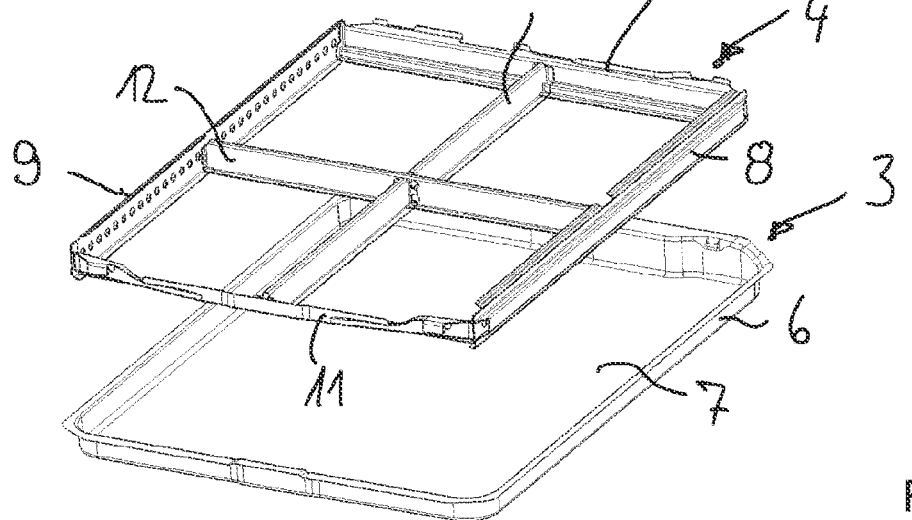
FIG. 5 shows an exploded perspective view of a housing assembly for accommodating electrical storage means in a further embodiment.
FIG. 6 shows an exploded perspective view of a base tray and structural frame in a modified embodiment for a housing assembly.

FIG. 5 shows a housing assembly 2 in a further embodiment. This largely corresponds to the embodiment shown in FIG. 4, to the description of which reference is therefore made with regard to the similarities. Identical and/or corresponding components are labelled with the same reference signs as in FIGS. 1 to 4 above.

A feature of the present embodiment according to FIG. 5 is that the base tray 3 is manufactured in one piece, i.e. the tray frame 6 and the base 7 form one part that is produced from a blank or a blank composite by means of the forming process, in particular by deep drawing. In this embodiment, the base 7 does not have a cooling structure, but is formed by the deep-drawn sheet metal. In order to nevertheless provide a cooling function for the battery modules, an upper cooling base 45 is provided, which is placed on the structural frame 4 and/or arranged between the frame and the cover 5. A one-piece base tray 3 has the advantage that there are no joints. In this embodiment, the housing assembly 2 can be attached to the vehicle body via the circumferential flange of the tray frame 6, for example, although the through-bolting shown in FIG. 3 is also possible as an alternative.

FIG. 6 shows an embodiment with a modified structural frame 4. The cover is not shown here for the sake of simplicity. The present embodiment largely corresponds to the embodiment according to FIG. 5, to the description of which reference is therefore made with regard to the similarities. Identical and/or corresponding components are labelled with the same reference signs as in FIGS. 1 to 5 above.

A feature of the embodiment according to FIG. 6 is that the structural frame 4 has transverse and longitudinal reinforcing elements 12, 12' which extend between the frame elements 8, 9, 10, 11, so that a window-like support structure is formed overall. The base tray 3 is manufactured in one piece, with the tray frame 6 and base 7 forming one part, which is manufactured by forming from a blank or a blank composite, in particular by deep drawing. In this embodiment, the base 7 has no cooling structure, and can be provided with a cooling base on top, as shown in FIG. 5. However, it is understood that the base 7 can also have a cooling structure, as shown as an example in FIG. 7.

Figure 7A:
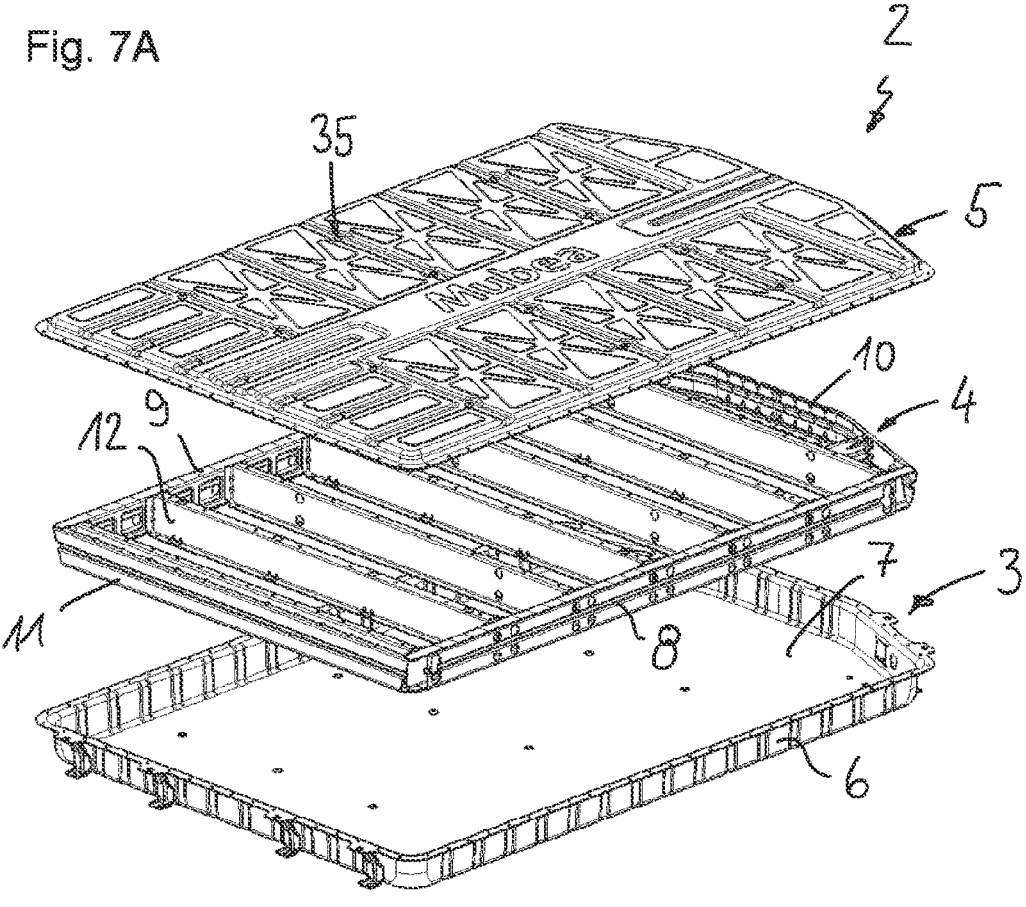
FIG. 7A shows an exploded perspective view of a housing assembly in a further embodiment.
Figure 7B:
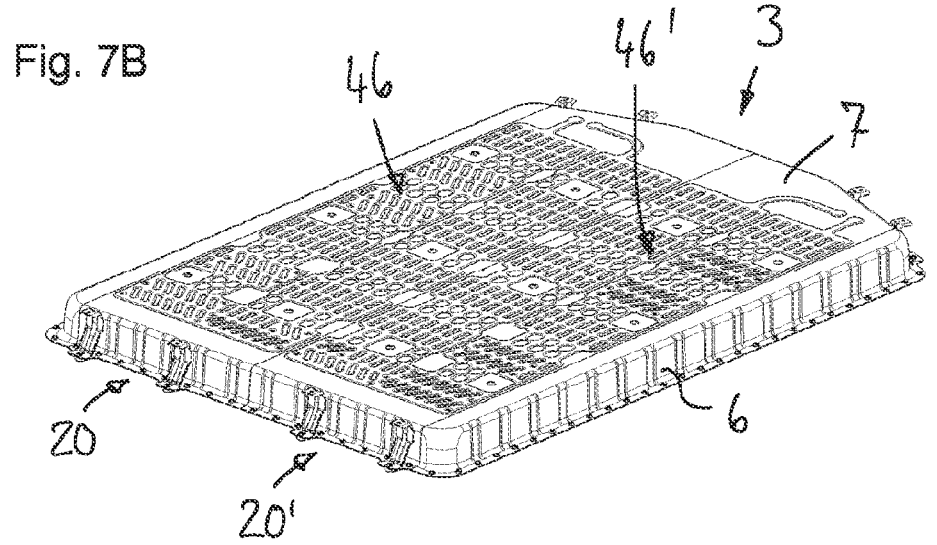
FIG. 7B shows the base tray from FIG. 7A as a detail in perspective view from below.

FIGS. 7A and 7B, together also referred to as FIG. 7, show a housing assembly 2 in a further embodiment. This largely corresponds to the embodiment shown in FIG. 4, so that reference is made to the above description with regard to the similarities. Identical and/or corresponding components are labelled with the same reference signs as in FIGS. 1 to 6 above.

A feature of the present embodiment according to FIG. 7 is that the base tray 3 is manufactured in one piece, i.e. the tray frame 6 and the base 7 form one part that is manufactured by means of the forming process from a blank composite of two roll-bonded base elements 20, 20', in particular by deep drawing. In this embodiment, base 7 and tray frame 6 form an integral base tray 3, with no joints between them. As can be seen in particular in FIG. 7B, the base tray 3 comprises two interconnected, roll-bonded base elements 20, 20', and correspondingly two cooling structures 46, 46', as described above. However, an embodiment comprising a single roll-bonded laminate with a cooling structure is also possible.

Overall, the housing assemblies 2 described above with a formed tray frame 6 have the advantage of a high level of high sealing properties, as weld seams in the wet area are avoided, thereby increasing safety. A functional separation can be made between a pure sealing and corrosion protection function on the one hand and a pure structural-mechanical function on the other. The sealing and corrosion protection function is performed by the base tray 3, whose sheet thickness and weight can be reduced to a minimum. The structural-mechanical function is performed by the structural frame 4, which is enclosed in a sealing manner by the base tray 3 and the cover 5 and can be designed with variable sheet thicknesses, for example made of tailor-rolled blanks, to optimise load-bearing capacity.

LIST OF REFERENCE SIGNS 2 housing assembly
3 base tray
4 structural frame
5 cover
6 tray frame
7 base
8 frame element
9 frame element
10 frame element
11 frame element
12 reinforcing element
13 wall region
14 flange region
15 flange region
16 sheet metal element
17 sheet metal element
18 bonding region
19 hollow region
20, 20' base element
21 support flange
22 cooling area
23 connection area
24 port
25 port
266 flange portion
27 flange portion
28 wall portion
29, 29' flange portion
30, 30' end flange
31, 31' side piece
32 base portion
33 thread
34 through opening
35 through-bolt assembly 36 inner sleeve
37 fixing sleeve
38 fixing sleeve
39 housing interior
40 outer profile
41 inner profile
42 flange section
43 flange section
44 opening
45 cooling base
46, 46' cooling structure
d6 thickness

The invention claimed is:

1. A housing assembly for accommodating electrical storage for an electric drive of an electrically drivable motor vehicle, comprising:
a base tray with a base and a circumferentially closed tray frame, which is formed from a metallic material; and
a structural frame that includes a plurality of frame elements connected to each other to form a circumferential frame and a plurality of reinforcing elements extending between two frame elements, wherein the frame elements and the reinforcing elements are respectively made of a steel material and are connected to each other to form the structural frame, and wherein the structural frame is connected to the base tray;
wherein the yield strength of the steel material of the frame elements and reinforcing elements is at least 10% greater than the yield strength of the metallic material of the tray frame;
a cover that is releasably connectable to the tray frame, wherein the tray frame and the cover enclose a receiving space for the electrical storage;
wherein the structural frame is arranged in the base tray inside the tray frame.

2. The housing assembly according to claim 1,
wherein the base tray is produced in two parts, wherein the tray frame is sealingly connected to the base, wherein the base including an integrated cooling structure configured so that a coolant can flow through the cooling structure;
wherein the base is produced from a plurality of aluminium sheets joined by roll bonding, which by rolling are bonded to each other in bonding regions and spaced apart from each other in hollow regions, which form the cooling structure.

3. The housing assembly according to claim 1,
wherein the tray frame has a Z-shaped profile when viewed in cross-section, wherein the tray frame extends from a lower flange region via an adjoining wall region in direction of an upper flange region.

4. The housing assembly according to claim 3,
wherein the upper flange region forms a flat sealing face for sealing connection to a counter face of the cover, and wherein the lower flange region forms a flat sealing face for sealing connection with a counter face of the base.

5. The housing assembly according to claim 1,
wherein the tray frame is made of a metallic material with a yield strength of less than 450 MPa.

6. The housing assembly according to claim 1,
wherein the base tray comprising the tray frame and base is produced in one piece from by forming.

7. The housing assembly according to claim 1,
wherein at least some of the reinforcing elements have incorporated threads for fastening the cover and/or battery modules insertable between the reinforcing elements, wherein the incorporated threads are produced by at least one of punching, deep-drawing, embossing, or cutting processes.

8. The housing assembly according to claim 1,
wherein a plurality of through-bolt assemblies are provided to fasten the housing assembly to a vehicle body.

9. The housing assembly according to claim 1,
wherein at least some of the reinforcing elements have a variable sheet thickness over a longest length of the respective reinforcing element, with the sheet thickness being increased at least in one of a region of an incorporated thread and at an end-side connecting portion.

10. The housing assembly according to claim 1,
wherein at least some of the frame elements of the structural frame are produced from a martensitically hardenable steel by hot forming.

11. The housing assembly according to claim 1,
wherein at least some of the frame elements of the structural frame are provided with an anti-corrosion coating.

12. The housing assembly according to claim 1,
wherein at least some of the frame elements of the structural frame have a variable sheet thickness over a longest length of the respective frame element.

13. The housing assembly according to claim 1,
wherein at least some of the reinforcing elements of the structural frame are produced from a cold-rolled steel with a yield strength of at most 550 MPa by cold forming.

14. The housing assembly according to claim 1,
wherein at least some of the reinforcing elements of the structural frame are provided with an anti-corrosion coating.

15. The housing assembly according to claim 1,
wherein at least some of the frame elements of the structural frame are designed in the form of a hollow profile comprising a C-shaped outer profile and a C-shaped inner profile connected thereto.

16. The housing assembly according to claim 1,
wherein the tray frame is made of sheet material with an elongation at break of at least 15% and an average sheet thickness of less than 3.0 millimeters.

* * * * *